(12) United States Patent
Canham et al.

(10) Patent No.: US 9,745,199 B2
(45) Date of Patent: Aug. 29, 2017

(54) MESOPOROUS SILICON

(75) Inventors: Leigh Trevor Canham, Worcestershire (GB); Armando Loni, Hereford and Worcester (GB)

(73) Assignee: PSIMEDICA LIMITED, Malvern (GB)

( * ) Notice: Subject to any disclaimer, the term of this patent is extended or adjusted under 35 U.S.C. 154(b) by 538 days.

(21) Appl. No.: 14/001,239

(22) PCT Filed: Feb. 27, 2012

(86) PCT No.: PCT/GB2012/050436
§ 371 (c)(1),
(2), (4) Date: Dec. 4, 2013

(87) PCT Pub. No.: WO2012/114126
PCT Pub. Date: Aug. 30, 2012

(65) Prior Publication Data
US 2014/0079930 A1 Mar. 20, 2014

(30) Foreign Application Priority Data

Feb. 25, 2011 (GB) .................................. 1103274.5

(51) Int. Cl.
*C01B 33/00* (2006.01)
*C01B 33/023* (2006.01)

(52) U.S. Cl.
CPC ........ *C01B 33/023* (2013.01); *C01P 2006/12* (2013.01); *C01P 2006/16* (2013.01)

(58) Field of Classification Search
CPC .................................................. C01B 33/023
USPC ....................................................... 423/350
See application file for complete search history.

(56) References Cited

U.S. PATENT DOCUMENTS

2006/0222582 A1  10/2006  Shipley

FOREIGN PATENT DOCUMENTS

| GB | 2464384 A | 4/2010 |
|---|---|---|
| JP | 2007-510613 A | 4/2007 |
| JP | 2011-006316 A | 1/2011 |
| JP | 2011-142826 | 6/2011 |
| WO | WO 97/006101 A1 | 2/1997 |
| WO | WO 00/066190 A1 | 11/2000 |
| WO | WO 2010/139987 A2 | 12/2010 |
| WO | WO 2011/022817 A | 3/2011 |
| WO | WO 2011/042742 A | 4/2011 |
| WO | WO 2012/114126 A1 | 8/2012 |

OTHER PUBLICATIONS

Mishra, et al., "Production and purification of silicon by calcium reduction of rice-husk white ash", J. Mat. Sci. 20 (1985), pp. 4387-4391.*
Banerjee et al. "Investigations on the Production of Silicon from Rice Husks by the Magnesium Method" Feb. 1, 1982 *Mat. Sci. Engineering* 52(2):173-179.
Brunauer et al. "Adsorption of Gases in Multimolecular Layers" Feb. 1938, *J. Am. Chem. Soc.* 60(2):309-319.
GB Search Report and Written Opinion for GB1103274.5 dated Jun. 24, 2011.
International Search Report and Written Opinion dated Apr. 20, 2012 for PCT/GB2012/050436.
Park et al. "Biodegraadable Luminescent Porous Silicon Nanoparticles for in vivo Applications" Feb. 22, 2009, *Nature Materials* 8:331-336.
Richman et al. "Ordered Mesoporous Silicon Through Magnesium Reduction of Polymer Templated Silica Thin Films," 2008, Nano Letters, vol. 8, No. 9, 3075-3079.
Zhu et al. "Synthesis and Characterization of Mesoporous Silicon Spheres from solid Silica Spheres" 2011, Materials Science Forum 675-677: 1069-1072.
Gregg et al. Adsorption, Surface Area and Porosity, $2^{nd}$ Edition, Academic Press, London, pp. 138-140, 1982.
Salonen et al. "Studies of Thermally-Carbonized Porous Silicon Surfaces" Nov. 2000, Phys. Stat. Solidi (a) 182(1):123-126.
Song et al. "Chemical Modification of Crystalline Porous Silicon Surfaces" 1999, Inorg. Chem. 21(1-3):69-84.
Guo et al. "Fabrication of high surface area mesoporous silicon via magnesiothermic reduction for drug delivery," *Microporous and Mesoporous Materials* (2011), 142:194-201.
Office Action in China Patent Office for CN201280002451 mailed Dec. 19, 2014.
Office Action in China Patent Office for CN201280002451 mailed Oct. 23, 2015.
Office Action in China Patent Office for CN201280002451 mailed Mar. 22, 2016.
Office Action in Japan Patent Office for JP2013-554946 mailed Jan. 12, 2016.

* cited by examiner

*Primary Examiner* — Steven Bos
(74) *Attorney, Agent, or Firm* — Pepper Hamilton LLP

(57) ABSTRACT

A method of making mesoporous silicon from silica, the mesoporous silicon obtained by the method, and uses of the mesoporous silicon are described. The mesoporous silicon may be derived from plants, particularly land-based plants.

17 Claims, No Drawings

MESOPOROUS SILICON

FIELD OF THE INVENTION

This invention relates to mesoporous silicon, methods for making mesoporous silicon, mesoporous silicon obtainable from said methods and uses of the mesoporous silicon. In particular, the mesoporous silicon may be mesoporous amorphous silicon or comprise at least some mesoporous amorphous silicon. In addition, this invention relates to mesoporous silicon which may be derived from plants, particularly land based plants.

BACKGROUND OF THE INVENTION

Porous silicon is found in a variety of applications where its benign nature, electronic and optical properties and entrapment of other materials is desirable.

Porous silicon can exist in a crystalline form (e.g. polycrystalline porous silicon) or non-crystalline form (i.e. amorphous porous silicon). Amorphous porous silicon tends to be more reactive than crystalline porous silicon. In addition, amorphous and crystalline porous silicon possess different optical properties. The presence or absence of a crystalline phase may be readily ascertained using x-ray diffraction.

There are numerous methods available for making porous silicon. For example, and as described in PCT/GB96/01863, bulk crystalline silicon can be rendered porous by partial electrochemical dissolution in hydrofluoric acid based solutions. This etching process generates a silicon structure that retains the crystallinity and the crystallographic orientation of the original bulk material. Hence, the porous silicon produced is a form of crystalline silicon.

Another conventional method for making porous silicon is the so-called stain-etching technique. This method involves the immersion of a silicon sample in a hydrofluoric acid solution containing a strong oxidising agent. No electrical contact is made with the silicon, and no potential is applied. The hydrofluoric acid etches the surface of the silicon to create pores.

It is also known to form crystalline porous silicon from porous silica. Typically, this involves the use of reducing agents at high temperatures. Such processes result in highly crystalline porous silicon.

There is a continued need for alternative and preferably improved methods for making porous silicon. It is an object of the present invention to provide a method for making mesoporous silicon, particularly mesoporous amorphous silicon, wherein preferably the method is more economically viable than existing methods. Further, the present invention is based partly on the surprising finding that mesoporous amorphous silicon may be made from mesoporous amorphous silica using a strongly exothermic reaction. Optionally, the silica is sourced from a cheap, sustainable and readily available source.

SUMMARY OF THE INVENTION

The present invention describes a method for making mesoporous silicon from silica, typically amorphous silica, for example mesoporous amorphous silica. The mesoporous silicon may comprise at least some mesoporous amorphous silicon. Further, the mesoporous silicon may consist of, consist essentially of, or comprise mesoporous amorphous silicon. Reference to mesoporous amorphous silicon herein indicates that the mesoporous silicon may consist of, consist essentially of, or comprise mesoporous amorphous silicon. The mesoporous amorphous silicon may further comprise polycrystalline silicon (e.g. mesoporous polycrystalline silicon). Alternatively, polycrystalline silicon (e.g. mesoporous polycrystalline silicon) may be absent or substantially absent. The silica from which the mesoporous silicon is derived may be amorphous silica, for example it may be mesoporous amorphous silica. The silica may consist of, consist essentially of, or comprise mesoporous amorphous silica. Reference to mesoporous amorphous silica herein indicates that the mesoporous silica may consist of, consist essentially of, or comprise mesoporous amorphous silica. Advantageously, the silica is derived or obtained from plant material. In particular, the silica may be derived or obtained from land based plants. Land based plants may also be referred to herein as terrestrial plants. The silica may be derived or obtained from plants excluding plants that grow in the sea. The silica may be derived or obtained from the plant material using extraction techniques such as solvent extraction. The extraction may be carried out in the presence of heat.

Accordingly, in a first aspect, the present invention provides a method of making mesoporous amorphous silicon comprising reducing amorphous silica. Typically, the amorphous silica is mesoporous amorphous silica.

In a second aspect, the present invention provides a method of making mesoporous amorphous silicon comprising obtaining amorphous silica from plant material and reducing the silica to form mesoporous amorphous silicon. Typically, the amorphous silica is mesoporous amorphous silica.

The mesoporous amorphous silicon may consist entirely of amorphous silicon or there may be present amounts of polycrystalline phase present. The presence of a crystalline phase may be verified using x-ray diffraction. For example <40 wt % of the elemental mesoporous amorphous silicon may be polycrystalline, <10 wt % of the elemental mesoporous amorphous silicon may be polycrystalline, <1 wt % of the elemental mesoporous amorphous silicon may be polycrystalline, >0.1 wt % of the elemental mesoporous amorphous silicon may be polycrystalline. There may be present highly defective phases of porous silicon. The defects may be "point defects" e.g. divacancies and clusters of interstitial silicon atoms or "extended defects" e.g. dislocations and stacking faults. The amounts of crystalline phases specified in accordance with the mesoporous amorphous silicon may also apply to the silica from which it is obtained.

The reduction in accordance with the first or second aspects of the present invention may be carried out at a reactant temperature of about 500° C. to about 700° C., for example 500° C. to less than 700° C., for example about 550° C. to about 650° C. The initial temperature may be set to about 450° C. to about 550° C. The temperature may be maintained in the desired range for from about 1 minute to about 8 hours, for example about 10 to 150 minutes. The reduction of the silica, which may be amorphous silica or mesoporous amorphous silica may be carried out in a reducing atmosphere. For example, the reduction may be carried out with a vaporizable reducing agent in an inert atmosphere. The silica may be reduced by metal vapour. The vaporizable reducing agent or metal vapour may comprise, or consist of, or consist essentially of one or more of the following metals: magnesium, aluminium or calcium. Advantageously, the reducing agent or metal vapour is magnesium.

There may be small residual amounts of carbon present in combination with the silica. These may assist with the reduction process, however, preferably, the amount of carbon present is less than 10 wt %, for example the reduction may take place in the absence, or substantial absence, of carbon.

The conversion of silica to silicon may take place in the presence of, or in the absence of, a moderator. When present, the moderator is inert to the extent that it remains unreacted throughout the process. Preferred moderators are salts that are soluble in water or organic solvents so that they can be dissolved out easily from the mesoporous silicon product once the reaction has been completed. The moderator may have a relatively high specific heat and also a relatively high latent heat of fusion, and it should preferably melt at a temperature close to or just above the temperature to which the reaction is to be controlled. If the reaction reaches a temperature where the moderator begins to melt it will absorb a great deal of heat from the reaction mixture, thus keeping the temperature of the reaction under control. Thus, the moderator acts as a heat sink, both by virtue of its specific heat and also its latent heat of fusion. Suitable examples of moderator include sodium chloride, potassium chloride and calcium chloride. At the start of the conversion process the moderator may be predominantly outside the porous particles or it may be partly present within the pores of those particles.

The meaning of the term "inert atmosphere" would be well-known to the person skilled in the art as including, for instance, noble gas atmospheres such as argon. In addition, as used herein the term "inert atmosphere" is intended to include processes in which the mesoporous silicon is prepared in a reducing atmosphere. A reducing atmosphere would include atmospheres in which some reaction is possible, but in which oxygen has been removed substantially or entirely. For instance, nitrogen, argon or hydrogen containing atmospheres may be used. Most often these would be argon or hydrogen containing atmospheres. In some instances the inert atmosphere would comprise entirely or substantially entirely argon and/or hydrogen, with other gases present only as impurities.

In embodiments of the invention, the atmosphere may be at reduced pressure (i.e. less than atmospheric pressure). Reduced pressures may be used and the inert atmosphere may be at a pressure in the range 10-80% atmospheric, 20-60% atmospheric, 30-50% atmospheric.

A preferred reducing agent for silica, including amorphous silica, which may be mesoporous amorphous silica is metallic magnesium. Magnesium is a particularly preferred reducing agent because it is very reactive towards silica and it develops a high vapour pressure at temperatures at which the reaction is carried out. The magnesium vapour will percolate into the porous structure of the silica where it reacts in the vapour phase. For the reaction between silica and magnesium using a moderator the preferred weight ratio of silica to moderator is from about 1:1 to 10:1. The reaction between silica and magnesium generally takes less than one hour, and is usually complete within about 5 minutes.

Apart from the mesoporous particles of elemental silicon, e.g. mesoporous amorphous silicon, the product of the reaction may include one or more by-products. These by-products include metal oxides, for example magnesium oxide. Such by-products can be dissolved out of the silicon product, together with the moderator (if present). The dissolution may be carried out by an aqueous solution of an acid that does not react with the mesoporous silicon product, e.g. hydrochloric acid. A wetting agent may be added to assist dissolution, for example an alcohol such as propan-2-ol.

The silica may be fully reduced or partially reduced. Following partial reduction, the mesoporous silicon may comprise a core of silica. For example, following partial reduction, the mesoporous amorphous silicon may comprise a core of mesoporous amorphous silica.

Preferably, when the silica is obtained from plant material it is not supplemented with high purity silica prior to its reduction to mesoporous amorphous silicon.

Advantageously, the only source of silica is from plant material. With regard to the second aspect of the invention, which relates to the formation of mesoporous amorphous silicon from silica derived from plant material, when the silica is derived from land based plants then the silicon produced need not necessarily comprise any amorphous silicon. As such and according to a third aspect, the present invention provides a method of making mesoporous silicon comprising obtaining silica from plant material and reducing the silica to form mesoporous silicon, wherein the plant material is land based. The mesoporous silicon may consist of or consist essentially of mesoporous polycrystalline silicon or may be mesoporous amorphous silicon.

The mesoporous silicon, e.g. the mesoporous amorphous silicon, produced in accordance with the present invention may be characterised over conventionally made mesoporous silicon by the presence of one or more of the following features: high surface area (e.g. greater than about 150 $m^2/g$); high pore volume (e.g. >0.5 ml/g or >0.7 ml/g); fully mesoporous regions at greater than 85 wt %, preferably greater than 95 wt %, for example up to about 99 wt % or up to 100 wt %; the presence of at least one metal, for example, selected from magnesium, calcium, aluminium on the pore wall surface at a concentration in the range of about 0.0001 wt % to 1 wt %; and a high solubility in aqueous liquids such as body fluids. The mesoporous amorphous silicon may also be characterised by being fully biodegradable at relatively low surface areas.

For example, the mesoporous amorphous silicon may be fully biodegradable and possess a surface area in any of the following ranges: >2 $m^2/g$ or >5 $m^2/g$ to <200 $m^2/g$, >2 $m^2/g$ or >5 $m^2/g$ to <150 $m^2/g$, >2 $m^2/g$ or >5 $m^2/g$ to <100 $m^2/g$, >2 $m^2/g$ to <5 $m^2/g$. As such, and according to a further aspect, mesoporous silicon obtainable by the methods according to the various aspects of the invention is provided. The mesoporous silicon may be mesoporous amorphous silicon.

There are a number of advantages associated with the present invention and the present invention seeks to provide one or more of the following: fully biodegradable mesoporous amorphous silicon; highly porous mesoporous amorphous silicon for example greater than about 60%, for example about 65 to about 95 vol % mesoporosity; high pore volumes, for example greater than about 0.7 ml/g; batch sizes up to at least 500 g; throughput of at least 1000 g/hour; good yields, for example up to about 90% by weight of the porous silica feedstock is converted to mesoporous silicon; mesoporous silicon and mesoporous amorphous silicon which may be loaded with high payloads of one or more active materials, for example in amounts greater than about 20 wt %, for example greater than about 40 wt %. For the purposes of the present invention, the mesoporous silicon, e.g. mesoporous amorphous silicon, has full biodegradability if it completely dissolves within one month into ortho-silicic acid, as a result of storage at 37° C. in agitated simulated body fluid such as 0.1M trizma, buffered to pH 7.4. Typically, about 5.5 mg of the mesoporous silicon is added to about 200 ml of trizma buffer and placed in sealed plastic containers. Biodegradability is monitored over time by taking 2.5 ml aliquots at, for example, 6 hrs, 24 rs, 48 hrs and so on, and subjecting each aliquot to a molybdate blue assay to determine the concentration of orthosilicic acid. This assay is described in detail in "The Chemistry of Silica" by Ralph Iler (John Wiley & Sons 1979) p94-101. Mesoporous silicon which undergoes 100% conversion into orthosilicic acid under these in-vitro conditions will also undergo full in-vivo biodegradation, as described for example in "Biodegradable luminescent porous silicon nanoparticles for in-vivo applications" by Ji-Ho Park et al. in Nature Materials, 22 Feb. 2009, DOI 10.1038/NMAT2398.

DETAILED DESCRIPTION OF THE INVENTION

Sources of Silica

The mesoporous silicon, which may be mesoporous amorphous silicon, may be formed from silica which has been obtained from plant material. The silica may have been obtained only from land based plants or land based plant feedstocks. For example, the silica may have been obtained from plants excluding sea based plants. For example, the silica may have been obtained from a source excluding one derived from diatoms, for example, excluding diatomaceous earth. In contrast to land based plants, sea based plants typically include amounts of crystalline silica. Preferably, the silica consists of or consists essentially of amorphous silica. Land based plants may grow on dry land or may refer to freshwater plants, for example, plants which grow at the side of river beds or bogs or marshes. Advantageously, the plant material may be organic plant material, i.e. plant material which has been grown under organic conditions. The plants may have been grown in the absence of synthetic fertilizer, synthetic herbicide and synthetic pesticide. Methods for recovering silica from plant material are known. For example, a process for the production of amorphous silica from siliceous plant matter is described in US 2006/0222582 and references therein, the contents of which are hereby incorporated in their entirety by reference.

The silica may be obtained from a renewable feedstock. Suitable feedstocks include weeds and edible crop residues. Suitable examples include silicon accumulating plants such as *equisetum arvese* (horsetail), *equisetum hyennale*, bamboo (e.g. *Arundinaria gigantean*), rice (*oryza sativa*), rice hulls, rice hull ash. Suitable plant groups, plant families and plant species are listed in Table 1. The silica may be obtained from any one of the listed plant groups or listed plant families in Table 1. The silica may be obtained from any one of the plant species listed in Table 1. Preferred plant groups are *Equisetophyta, Angiosperm, Marchantiophyta, Gymnosperm* and *Polypodiophyta*. The silica may be obtained from the plant material which has first been converted to a powdered form, or it may be obtained from an extract from a particular part of the plant such as tabasheer which may be extracted from the joints of bamboo. For example, silica may be obtained from any one or more of the roots, stems, branches or leaves of a particular plant. Preferably, the plant feedstocks are heavy silicon accumulators, i.e. containing >5 wt % silicon by dry weight, are fast growing and contain no or substantially no crystalline silica. The >5 wt % may either refer to the whole plant or a selected part of the plant, for example one or more of the roots, stems, branches or leaves.

TABLE 1

| PLANT GROUP/FAMILY | SPECIES | COMMON NAME |
|---|---|---|
| Equisetophyta | *Equisetum arvense* | Common horsetail |
| | *Equisetum hyemale* | Rough horsetail |
| Angiosperm | | |
| Fagaceae | *Fagus sylvatica* | European beech |
| Fabaceae | *Glycine max* | Soybean |
| Poaceae | *Arundinaria gigantea* | Cane |
| | *Oryza sativa* | Rice |
| | *Triticum aestivum* | Wheat |
| | *Hordeum vulgare* | Barley |
| | *Saccharum officarium* | Sugarcane |
| | *Avena sativa* | Oat |
| | *Sorghum bicolor* | Sorghum |
| | *Agrostis stolonifens* | |
| | *Chasmanthium latifolium* | Wood oats |
| | *Panicum texanum* | Goose grass |
| | *Panicum commutatum* | |
| | *Pennisetum Purpureum* | Uganda grass |
| | *Pleiobastus chino* | Angustifolia bamboo |
| | *Sasa veichii* | Japanese bamboo |
| | *Bambusa arundinacea* | |
| | *Phyllostachys pubescens* | Moso bamboo |
| | *Andropogon scoparius* | Little Bluestem |
| Cyperaceae | *Carex cinica* | Sedge |
| | *Eleocharis uniglumis* | Slender spike rush |
| Asteraceae | *Helianthus annuus* | Sunflower |
| Lamiaceae | *Mentha piperita* | Peppermint |
| Urticeae | *Urtica dioica* | Nettle |
| Marchantiophyta | *Marchantia polymorpha* | Liverworts |
| Gymnosperm | *Abies pectinata* | Silver fir |
| Polypodiophyta | *Osmunda japonica* | Japanese royal fern |

Typically, the first step comprises cleaning the plant material to remove foreign matter such as stones, dirt, sand and other extraneous matter, this may include screening and washing. If the source of silica is concentrated in a particular part of the plant, for example the stem, or the leaves, or the branches or the roots, then the particular part of the plant may first be separated from the remainder of the plant. This means that resources are not needlessly expended on parts of the plant which yield no or small amounts of silica. Washing is preferably carried out with water which may optionally comprise a surfactant to aid in the removal of extraneous matter. The plant material may then be divided into smaller parts which may be more readily wetted, soaked and penetrated by chemicals. Suitable dividing means include pulverizing, crushing, shredding, milling and the like. The plant material may be steeped in water, optionally at an elevated temperature over an effective length of time. The plant material may be heated in the presence of a mineral acid such as HCl (e.g. 10% HCl). The plants may be immersed for periods of up to about 2 hours at a suitable temperature, for example about 100° C. The material obtained from this process may be rinsed in water and dried and then calcined at a suitable temperature, for example about 500° C., for a suitable period of time (e.g. about 2 hours) resulting in porous silica. In addition, or alternatively, the silica obtained from the plant material may be dried during the part of the procedure when the silica is reduced to silicon. However, it is preferable that all, or substantially all, of the volatiles, e.g. solvents used in the solvent extraction, are removed before the actual reduction of the silica to silicon commences.

Silicon

As used herein, and unless otherwise stated, the term "silicon" refers to solid elemental silicon. For the avoidance of doubt, and unless otherwise stated, it does not include silicon-containing chemical compounds such as silica, silicates or silicones, although it may be used in combination with these materials. References in this section to mesoporous silicon include mesoporous amorphous silicon and references to mesoporous silica include mesoporous amorphous silica. The purity of the mesoporous silicon may depend to some extent on the final application of the mesoporous silicon. For example, the mesoporous silicon may be about 95 to 99.99999% pure, for example about 96 to 99.9% pure or about 98 to 99.5% pure. Mesoporous silicon, e.g. mesoporous amorphous silicon, contains pores having a diameter in the range of 2 nm to 50 nm. The mesoporous silicon may be surface porosified or more substantially porosified. Mesoporous silica, e.g. mesoporous amorphous silica, contains pores having a diameter in the range of 2 nm to 50 nm. The mesoporous silica may be surface porosified or more substantially porosified. The pore diameters are measured by BET nitrogen adsorption. The BET nitrogen adsorption method is described in Brunauer et al., J. Am. Chem. Soc., 60, p309, 1938. The BET measurement is performed using a Tristar 3000 Micrometrics instrument. The sample is outgassed under flowing dry nitrogen at 120° C. for 16 hours before measurement.

The surface area and the size of the pores in the silicon may to some extent depend on what application the mesoporous silicon is to be used for. The mesoporous silicon may be loaded with an additional material which is to be delivered to a human or animal subject. The BET surface area of mesoporous crystalline silicon is preferably greater than 200 $m^2/g$ for biodegradability. The BET surface area of the mesoporous amorphous silicon made in accordance with the present invention may be greater than 2 $m^2/g$ or greater than 5 $m^2/g$ for biodegradability. Advantageously, the present invention provides fully biodegradable mesoporous amorphous silicon which possesses a BET surface area of less than 200 $m^2/g$, for example less than 150 $m^2/g$, for example less than 100 $m^2/g$, for example less than 5 $m^2/g$. As such, the present invention provides biodegradable mesoporous amorphous silicon possessing a BET surface area in the following ranges: >2 $m^2/g$ or >5 $m^2/g$ to <200 $m^2/g$, >2 $m^2/g$ or >5 $m^2/g$ to <150 $m^2/g$, >2 $m^2/g$ or >5 $m^2/g$ to <100 $m^2/g$, >2 $m^2/g$ to <5 $m^2/g$. In a further aspect, the present invention therefore provides fully biodegradable mesoporous silicon derived from plants. The BET surface area is determined by a BET nitrogen adsorption method as described in Brunauer et al., J. Am. Chem. Soc., 60, p309, 1938. The BET measurement is performed using a Tristar 3000 Micrometrics instrument. The sample is outgassed under flowing dry nitrogen at 120° C. for 16 hours before measurement.

The pore volume of the mesoporous silicon is preferably in excess of 0.7 ml/g and is measured by BET analysis using a Tristar 3000 Micromeritics instrument and standard BJH (Barrett Joyner Harlender) analysis of the isotherm, as described in Adsorption, Surface Area and Porosity by S. J. Gregg and K. S. W. Sing, $2^{nd}$ Edition, Academic Press, London.

The mesoporous silicon formed according to the present invention may be derivatised. Derivatised porous silicon is porous silicon possessing a covalently bound monolayer on at least part of its surface. The monolayer typically comprises one or more organic groups that are bonded by hydrosilylation to at least part of the surface of the porous silicon. Derivatised porous silicon is described in PCT/GB00/01450, the contents of which are incorporated herein by reference in their entirety. PCT/GB00/01450 describes derivatisation of the surface of silicon using methods such as hydrosilylation in the presence of a Lewis acid. In that case, the derivatisation is effected in order to block oxidation of the silicon atoms at the surface and so stabilise the silicon. Methods of preparing derivatised porous silicon are known to the skilled person and are described, for example, by J. H. Song and M. J. Sailor in Inorg. Chem. 1999, vol 21, No. 1-3, pp 69-84 (Chemical Modification of Crystalline Porous Silicon Surfaces). Derivitisation of the silicon may be desirable when it is required to increase the hydrophobicity of the silicon, thereby decreasing its wettability. Preferred derivatised surfaces are modified with one or more alkyne groups. Alkyne derivatised silicon may be derived from treatment with acetylene gas, for example, as described in "Studies of thermally carbonized porous silicon surfaces" by J. Salonen et al in Phys Stat. Solidi (a), 182, pp 123-126, (2000) and "Stabilisation of porous silicon surface by low temperature photoassisted reaction with acetylene", by S. T. Lakshmikumar et al in Curr. Appl. Phys. 3, pp 185-189 (2003).

The surface of the elemental silicon may comprise one or more silicon compounds. For example, at least some of the mesoporous silicon surface may comprise silicon bonded to oxygen to form an oxide layer. The mesoporous silicon may be oxidised mesoporous silicon. The silicon particles may possess an oxide content corresponding to between about one monolayer of oxygen and a total oxide thickness of less than or equal to about 4.5 nm covering the entire silicon skeleton. The mesoporous silicon may have an oxygen to silicon atomic ratio between about 0.04 and 2.0, and preferably between 0.60 and 1.5. Oxidation may occur in the pores and/or on the external surface of the silicon. There may be at least one metal, for example, selected from magnesium or calcium or aluminium present on the surfaces of the pore walls at a concentration in the range of about 0.0001 wt % to 1 wt %.

The silica may be fully reduced or partially reduced. Following partial reduction, the mesoporous silicon may comprise a core of silica. For example, following partial reduction, the mesoporous amorphous silicon may comprise a core of amorphous silica which may be mesoporous amorphous silica.

Mesoporous silicon, e.g. mesoporous amorphous silicon obtained according to the present invention may be distinguishable due to the processes involved in the method of production. For example, the chemical composition of the mesoporous silicon may differ compared to mesoporous silicon produced using conventional techniques. Both of the conventional techniques, anodisation and stain etching, rely on hydrofluoric acid based etchants. While hydrofluoric acid can be completely removed after porosification, residual trace fluoride is usually detectable by sensitive techniques such as Secondary Ion Mass Spectroscopy. The present invention does not utilize hydrofluoric acid, and if the plant feedstock, chemicals, solvents and reducing agents do not contain significant fluoride contamination, the resulting mesoporous silicon will contain dramatically reduced or even undetectable fluoride signals. In contrast, structures of the present invention may have detectable levels of the metal used for reduction, for example magnesium. Magnesium is not normally detected in significant levels in mesoporous silicon made by anodization or stain etching.

The colour of the partially reduced mesoporous silicon powder prepared by the present invention differs significantly from that prepared by anodisation or stain etching. Typically, it is a much lighter shade of brown than anodized or stain etched powder. It may also have a greyish hue. The lighter shade of mesoporous silicon obtained is advantageous because it means the mesoporous silicon may be incorporated into a broad range of products where colour may be an important issue, for example toothpaste.

Typically, the methods in accordance with the present invention generate different spatial distributions of silicon and oxygen when compared to those generated by anodization and stain etching. In connection with the present invention, silicon may be distributed at the outer surfaces of the particles and inner pore wall surface. For particles prepared by anodization or stain etching and then subjected to partial oxidation, the oxygen is preferentially distributed at the outer surfaces of the particles and the inner pore wall surface.

Process Flow

References to mesoporous silicon in this section include reference to mesoporous amorphous silicon. References to silica in this section include reference to amorphous silica and reference to mesoporous amorphous silica. The mesoporous silicon may be prepared as part of a multistep process. The steps of the process may be split broadly into three steps: Step (i) pre-conditioning, Step (ii) thermal reduction and Step (iii) chemical leaching. The pre-conditioning step (Step (i)) involves the production of porous silica, preferably mesoporous silica, from plant material. Typically, organic phases and impurities may be removed from plant material or plant feedstock (which may be in the form of a powder) by the use of chemicals followed by heating to create silica, for example amorphous silica which may be mesoporous. Methods of making amorphous silica from plant material are known. However, it is considered by the present inventors that it is, until the present invention, unknown to prepare porous silicon from silica derived or obtained from land based plants. The amorphous silica may then be mixed with a reducing agent, for example a metal such as magnesium, calcium or aluminium.

Following the pre-conditioning step, the silica is thermally reduced. For example, following blending with a reducing agent, (and optionally a moderator), the blend of silica and reducing agent may be heat treated in an inert atmosphere. The meaning of the term "inert atmosphere" includes, for example, noble gas atmospheres such as argon. In addition, as used herein the term "inert atmosphere" is intended to include processes in which the mesoporous silicon is prepared in reducing atmospheres. A reducing atmosphere includes atmospheres in which some reaction is possible, but in which oxygen has been removed substantially or entirely. For instance, nitrogen, argon or hydrogen containing atmospheres may be used. Most often these would be argon or hydrogen containing atmospheres, in some instances the inert atmosphere would comprise entirely, or substantially entirely, argon and/or hydrogen, with other gases present only as impurities.

In some examples, the atmosphere may be at reduced pressure (i.e. less than atmospheric pressure). Reduced pressures may be used and the inert atmosphere may be at a pressure in the range 10-80% atmospheric, 20-60% atmospheric, 30-50% atmospheric.

Following the thermal reduction step, unwanted by-products may be separated and removed from the mesoporous silicon. This may be carried out by chemical leaching. For example, the crude product may be chemically leached using HCl to remove any residual metal phases. Leaching may be conducted with the addition of heat. These by-products include metal oxides, for example magnesium oxide. Such by-products can be dissolved out of the silicon product, together with the moderator (if present). The dissolution may be carried out by an aqueous solution of an acid that does not react with the mesoporous silicon product, e.g. hydrochloric acid. A wetting agent may be added to assist dissolution, for example an alcohol such as propan-2-ol.

The temperature at which the reaction takes place may be controlled. Otherwise, owing to its exothermic nature, the temperature may increase to a level far above the maximum that will allow a porous silicon product. A preferred method of carrying out the reaction in a controlled manner is by means of a belt furnace, in which the reactants are conveyed through a series of zones on a continuously-moving belt.

In a first zone, a mixture of silica particles (which may be amorphous), reducing agent and, optionally, a moderator are pre-heated, preferably to a temperature just below that at which a reaction between the reducing agent and the silica initiates.

The reactants may then be conveyed to a second zone in which the temperature is raised sufficiently to initiate the reaction (about 450° C. to 550° C.), in which zone the temperature is controlled, preferably so that it remains within the range about 500° C. to about 700° C., for example about 500° C. to less than 700° C., preferably 550° C. to 650° C. Should the temperature rise to the melting point of the moderator, the moderator will begin to melt, absorbing heat from the reactants as a result of its latent heat of fusion thus inhibiting any further temperature rise. The speed of the belt may be adjusted so that when the reaction has been completed the reactants leave the second zone and pass into a third (cooling) zone. There, the temperature may be reduced to a much lower temperature, for example, ambient temperature or below.

Uses of the Mesoporous Silicon

References to mesoporous silicon in this section include reference to mesoporous amorphous silicon. References to silica in this section include reference to amorphous silica and reference to mesoporous amorphous silica. The mesoporous silicon made according to the present invention may be used in numerous applications. Application areas include, but are not limited to, cosmetics, personal care, oral hygiene, medicaments (e.g. drug delivery, including oral drug delivery) and food. Other application areas include in-vivo imaging, diagnostics, fuel cells, batteries and explosives. Specific product examples which may utilise such materials include, but are not limited to, chocolate, chewing gum and toothpaste. The mesoporous amorphous silicon is of particular use in sunscreens.

The mesoporous silicon may be used as a foodstuff in its own right and may, optionally, be loaded with one or more ingredients. The mesoporous amorphous silicon may provide a dietary supplement of improved silicic acid bioavailability. The silicon may be loaded such that the one or more ingredients are entrapped by the mesoporous silicon. These ingredients may be selected from one or more of: oxygen sensitive edible oils; minerals; oxygen sensitive fats including dairy fats; oil soluble ingredients; vitamins; fragrances or aromas; flavours; enzymes; probiotic bacteria;

prebiotics; nutraceuticals; amino acids; herbal extracts; herbs; plant extracts; edible acids; salt; antioxidants; therapeutic agents.

The mesoporous silicon may be loaded with a pharmaceutical or toxic chemical species for timed release. One or more biological materials, such as bacteria, virus, antigens or other inoculants may be added to the mesoporous silicon for slow release to affect biological control and treatment.

The mesoporous silicon may be used in a dentifrice composition such as a toothpaste, tooth powder, gum or oral gel. It may be present as an abrasive and/or for delivering one or more entrapped ingredients. The dentifrice composition will comprise constituents well known to one of ordinary skill; these may broadly be characterised as active and inactive agents. Active agents include anticaries agents such as fluoride, antibacterial agents, desensitising agents, antitartar agents (or anticalculus agents) and whitening agents. Inactive ingredients are generally taken to include water (to enable the formation of a water phase), detergents, surfactants or foaming agents, thickening or gelling agents, binding agents, efficacy enhancing agents, humectants to retain moisture, flavouring, sweetening and colouring agents, preservatives and, optionally further abrasives for cleaning and polishing.

The mesoporous silicon may be used as a biodegradable contrast agent for medical imaging purposes within animal or mammalian tissues.

The mesoporous silicon in particulate form may be included with other ingredients to form a dermatological composition. The absorption of UV radiation by the mesoporous silicon is high, therefore the composition may be a sunscreen composition. The composition may further comprise a dermatologically acceptable carrier. The dermatological carrier may comprise a natural or synthetic fat; the fat may be an oil or a wax. The dermatological, or sunscreen, composition may comprise one or more of: a fatty binder, a filler, a pigment, a volatile oil, an anti-oxidant, a surfactant, a basifying agent, an acidifying agent, and a fragrance. The dermatological composition may have a composition such that it is one of: a cream, a lotion, a topical solution, a paste, a linament, a powder, a gel, a tincture, and an aerosol. Suitably the mesoporous amorphous silicon particles may have a particle size in the range from 0.01 µm to 250 µm. For example, the particle size may be submicron and in the range from 0.03 µm to 0.9 µm, or preferably in the range 0.05 to 0.5 µm. For example, the particle size may be in the microparticle range from 1 µm to 50 µm or preferably in the range 2 µm to 20 µm. The particle size range chosen may be dependent on the intended use of the composition. For use in sunscreen applications, it may be desirable for the particles to have a size that effectively absorbs and/or scatters ultraviolet wavelengths in the range 280 to 400 nm. The upper bound to the particle size of the porous silicon may be limited by the need for the composition to be comfortable in use. Particles which are too large will result in the composition being granular to the touch and which may cause abrasion of the skin on application.

In the present invention, particle size distribution measurements, including the mean particle size ($d_{50}$/µm), $d_{90}$ and $d_{10}$ of the mesoporous silicon particles are measured using a Malvern Particle Size Analyzer, Model Mastersizer, from Malvern Instruments. A helium-neon gas laser beam is projected through a transparent cell which contains the silicon particles suspended in an aqueous solution. Light rays which strike the particles are scattered through angles which are inversely proportional to the particle size. The photodetector array measures the quantity of light at several predetermined angles. Electrical signals proportional to the measured light flux values are then processed by a microcomputer system, against a scatter pattern predicted from theoretical particles as defined by the refractive indices of the sample and dispersant solution to determine the particle size distribution of the silicon.

EXAMPLES

Example 1

Samples of Horsetail (HT) powder (*Equisetum Arvense*), procured from Cotswold Health Products (Gloucestershire, UK), were immersed in 10% hydrochloric acid at 100° C. for about 2 hr (or less). In Table 2, "30 mins, replenished 90 mins" indicates that after 30 minutes the HCl was replaced with fresh HCl and the sample immersed for a further 90 minutes. Subsequent to water-rinsing and drying, the powders were calcined in air at 500° C. for 2 hr (or less), resulting in porous silica with the properties shown in Table 2. The porous silica powders were then blended with magnesium powder in the molar ratio 1:2 ($SiO_2$:2 Mg). The magnesium/porous silica blends were then mixed with hand-milled sodium chloride powder in a 1:1 ratio by weight. Using a belt furnace, the blends were heat-treated in Argon at 600° C. for 1 hr, resulting in reduced powders, which were dark grey-brown in colour. The reduced powders were leached in 37% HCl at 70° C. for 1 hr to remove residual magnesium phases, resulting in a brown mesoporous amorphous silicon powder with the properties shown in Table 2.

Mass yields for the unoptimized process flow were: 34% for Step (i) to 10% after Step (ii) to an (estimated) 5% for Step (iii). Mass yields are highly dependent on the silica content of the plant feedstock used which is preferably as high as possible. The absence of diffraction peaks by XRD is evidence of a lack of silicon polycrystallinity in the product material. The sample may then be annealed at 800° C. for 1 hour in an inert ambient atmosphere. The appearance of polycrystalline silicon related peaks is evidence of the presence of amorphous silicon prior to annealing. Optical transmission measurements in the visible region can also indicate the presence of amorphous silicon which will typically display higher absorption coefficients than crystalline silicon and an absorption edge around 1.7 eV. Raman, HTEM or NMR analysis are other techniques capable of distinguishing amorphous silicon from polycrystalline phases.

TABLE 2

| Sample | 10% HCl @100° C. | Calcine @ 500° C. | Colour | SA ($m^2$/g) | PV (ml/g) | PD (nm) | Reduction @ 600° C., Mg vapour | Colour following reduction | Colour following additional HCl leach | SA ($m^2$/g) | PV (ml/g) | PD (nm) |
|---|---|---|---|---|---|---|---|---|---|---|---|---|
| HT Powder Feedstock | | | Light green | 1.5 | 0.004 | | | | | | | |
| HT Powder Feedstock | 2 hours | | Brown | 8.6 | 0.03 | | | | | | | |
| HT Powder Feedstock | 30 mins, replenished 90 mins | 1 hour | Light grey white | 209.5 | 0.317 | 5.8-6.4 | 1 hour | Dark grey, dark brown | dark brown | 111.6 | 0.255 | 8.7-10.2 |
| HT Powder Feedstock | 30 mins, replenished 90 mins | 2 hours | White | 233.1 | 0.354 | 5.8-6.4 | 1 hour | Dark grey, dark brown | dark brown | 103.1 | 0.21 | 7.9-9.9 |

TABLE 2-continued

| Sample | 10% HCl @100° C. | Calcine @ 500° C. | Colour | SA (m²/g) | PV (ml/g) | PD (nm) | Reduction @ 600° C., Mg vapour | Colour following reduction | Colour following additional HCl leach | SA (m²/g) | PV (ml/g) | PD (nm) |
|---|---|---|---|---|---|---|---|---|---|---|---|---|
| HT Powder Feedstock | 30 mins, replenished 30 mins | 1 hour | Light grey white | 216.7 | 0.319 | 5.7-6.2 | 1 hour | Dark grey, dark brown | dark brown | 117.3 | 0.242 | 8.0-9.6 |

SA—surface area
PV—pore volume
PD—pore diameter

Example 2

A sample of bamboo plant extract was processed. The bamboo extract was obtained commercially from Soliance Ltd, France as a powder. The bamboo extract was blended with magnesium powder in a molar ratio of 1:2. The resulting blend was then further blended with sodium chloride powder in a 1:1 ratio by weight. The blend of bamboo, magnesium and sodium chloride powder was then loaded in a quartz tray and passed through a belt furnace for over 2 hours. The hottest zone was set at a temperature of 500° C.

Table 3 shows the surface area, pore volume and mean pore diameter data before magnesiothermic reduction (indicated as "Before" in Table 3) and after reduction and HCl removal of the magnesium phases ("After").

TABLE 3

| Sample | | SA (m²/g) | PV (ml/g) | PD (nm) | Colour |
|---|---|---|---|---|---|
| Bamboo extract | Before | 46.6 | 0.209 | 19 | White |
| | After | 356 | 0.564 | 8 | Light brown |

The purity of the oxidised porous silicon in the reduced bamboo extract was estimated to be ~96% from electron probe microanalysis with the major impurities being sodium, aluminium and calcium.

The invention claimed is:

1. A method of making mesoporous amorphous silicon comprising reducing amorphous silica, said method comprising:
   mixing amorphous silica with a reducing agent to form a mixture; and
   heating the mixture of amorphous silica and the reducing agent to vaporize at least some of the reducing agent to initiate a reaction in which the amorphous silica is reduced to mesoporous amorphous silicon in an inert atmosphere and wherein the temperature is maintained in a range from 550° C. to 650° C. for the duration of the reaction.

2. The method according to claim 1, wherein the amorphous silica is mesoporous amorphous silica.

3. The method according to claim 1, wherein the mesoporous amorphous silicon further comprises mesoporous polycrystalline silicon or a defective phase of mesoporous silicon.

4. The method according to claim 3, wherein the mesoporous amorphous silicon comprises mesoporous polycrystalline silicon in an amount of less than 40 wt %, less than 10 wt %, or less than 1 wt %.

5. The method according to claim 4, wherein the mesoporous amorphous silicon comprises mesoporous polycrystalline silicon in an amount of greater than 0.1 wt %.

6. The method according to claim 1, wherein the reducing agent is magnesium, calcium or aluminum.

7. The method according to claim 1, further comprising chemically leaching unwanted by-products from the mesoporous amorphous silicon.

8. The method according to claim 7, wherein the unwanted by-products comprise at least one of magnesium oxide and magnesium silicate.

9. The method according to claim 7, wherein the unwanted by-products are leached from the mesoporous amorphous silicon with hydrochloric acid.

10. The method according to claim 1, wherein the silica is obtained from land-based plant material or a land-based plant feedstock.

11. The method according to claim 10, wherein the plant material is selected from one or more of *Equisetophyta, Angiosperm, Marchantiophyta, Gymnosperm, Polypodiophyta, Fagaceae, Fabaceae, Poaceae, Cyperaceae, Asteraceae, Lamiaceae*, and *Urticeae*.

12. The method according to claim 11, wherein the plant material has been grown in the absence of synthetic fertilizer, synthetic herbicide and synthetic pesticide.

13. The method according to claim 1, wherein the amorphous silica is partially reduced.

14. The method according to claim 13, wherein the mesoporous amorphous silicon produced comprises a core of mesoporous amorphous silica.

15. The method according to claim 1, wherein the mesoporous amorphous silicon possesses an oxide content corresponding to between about one monolayer of oxygen and a total oxide thickness of less than or equal to about 4.5 nm covering the entire silicon skeleton.

16. The method according to claim 1, wherein the mesoporous amorphous silicon has an oxygen to silicon atomic ratio between about 0.04 and 2.0, or between 0.60 and 1.5.

17. The method according to claim 10, wherein the land-based plant material or land-based plant feedstock comprises greater than 5 wt % of amorphous silica on a dry weight basis.

* * * * *